United States Patent
Camboulives et al.

[15] 3,687,222
[45] Aug. 29, 1972

[54] DEVICE FOR DAMPING THE NOISE PRODUCED BY A GAS JET ESCAPING FROM A DUCT

[72] Inventors: Andre Alphonse Mederic Leon Camboulives, Billancourt; Jean-Claude Lucien Delonge, Moissy-Cramayel; Theophile Francois Le Maout, Cesson; Roger Alfred Jules Vandenbroucke, Antony, all of France

[73] Assignee: Societe Nationale d'Etude et de Construction de Moteurs d'Aviation, Paris, France

[22] Filed: May 3, 1971

[21] Appl. No.: 139,746

[30] Foreign Application Priority Data
May 11, 1970 France.....................7017065

[52] U.S. Cl. ..........181/33 HC, 181/33 HD, 181/51, 181/65, 239/265.17, 239/265.19
[51] Int. Cl..........B64d 33/06, F01n 1/14, F01n 1/16
[58] Field of Search .181/33 R, 33 H, 33 HA, 33 HB, 181/33 HC, 33 HD, 43, 51, 64, 65; 239/127.3, 265.11, 265.13, 265.17, 265.19

[56] References Cited

UNITED STATES PATENTS

| | | |
|---|---|---|
| 3,346,193 | 10/1967 | Tumicki............239/265.17 |
| 3,386,658 | 6/1968 | Mehr....................239/127.3 |
| 3,420,442 | 1/1969 | Teagle..................239/127.3 |
| 3,587,973 | 6/1971 | Wolf et al. ..............181/51 X |
| 2,682,147 | 6/1954 | Ferris ....................239/127.3 |
| 3,289,945 | 12/1966 | Noren...................239/265.19 |
| 3,432,100 | 3/1969 | Hardy et al. ............239/127.3 |
| 3,543,877 | 12/1970 | Ranvier et al. .........239/127.3 |

Primary Examiner—Robert S. Ward, Jr.
Attorney—William J. Daniel

[57] ABSTRACT

A device for damping the noise produced by a jet escaping from a duct in particular a jet engine nozzle, including silencer elements that are movable by control devices to project into the jet for silencing and retractable out of the jet for normal thrust, wherein, for reducing load on the control devices, means are provided for assisting movement of the silencer elements from their silencing position to their retracted position.

15 Claims, 14 Drawing Figures

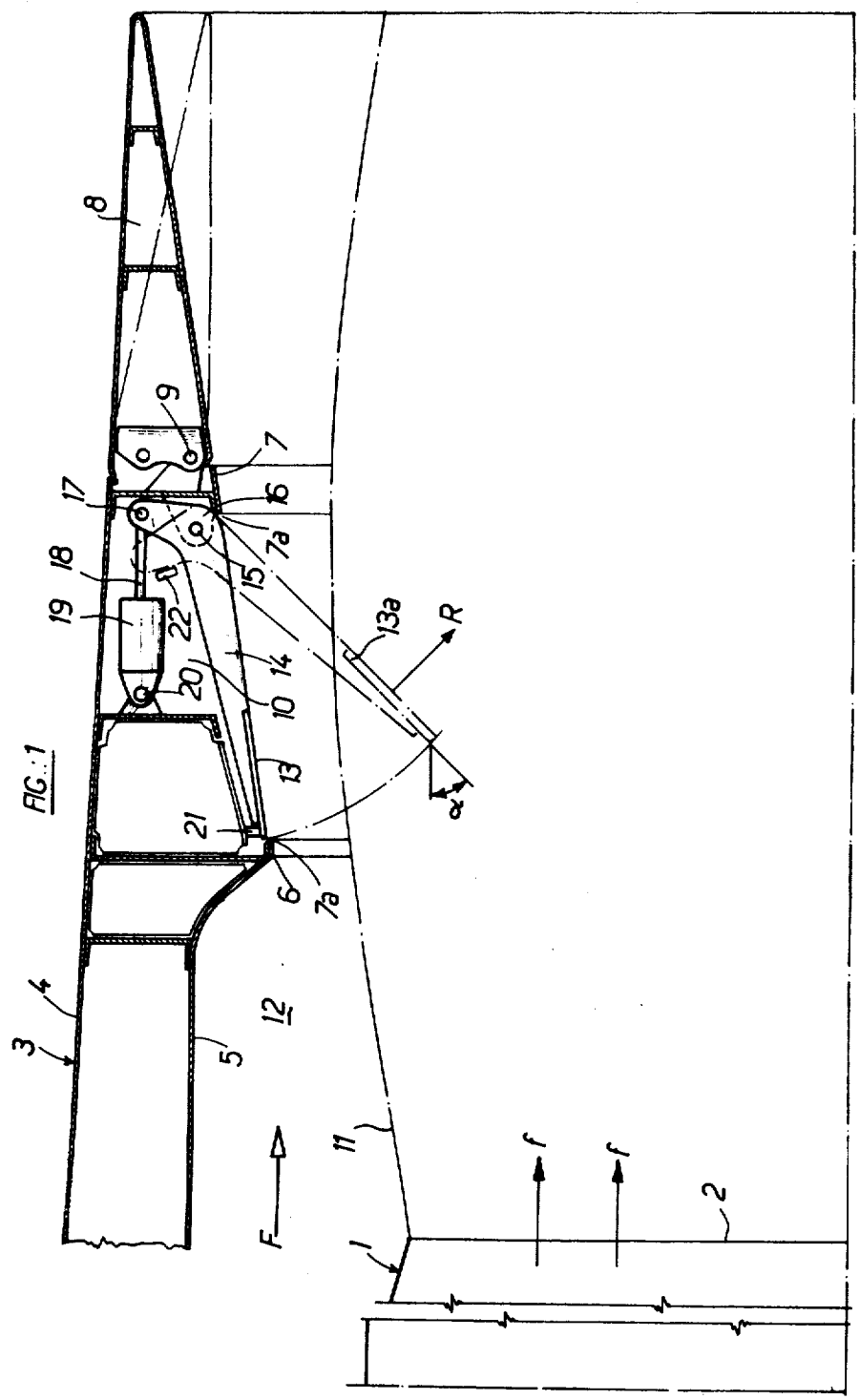

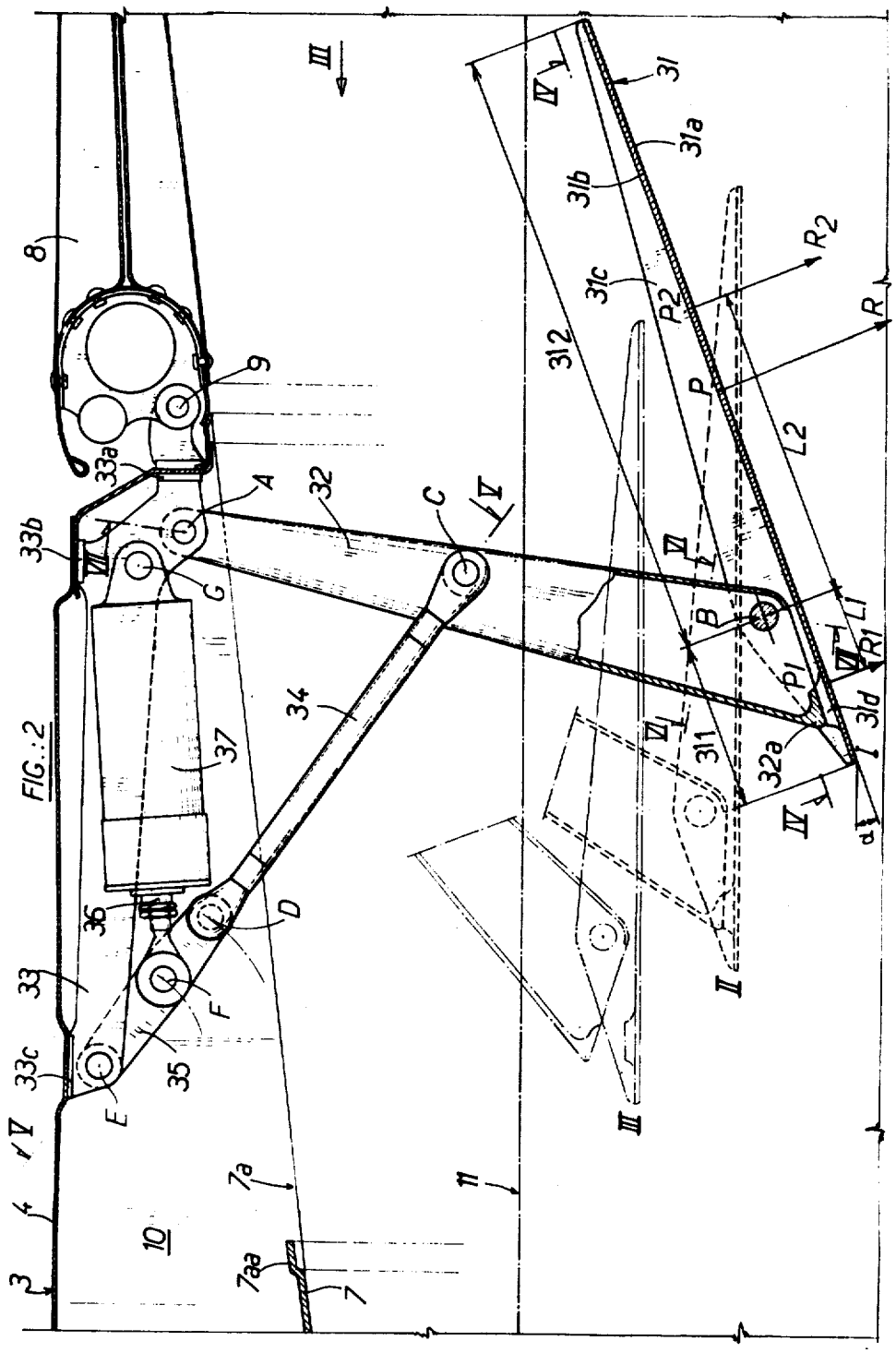
FIG.:2

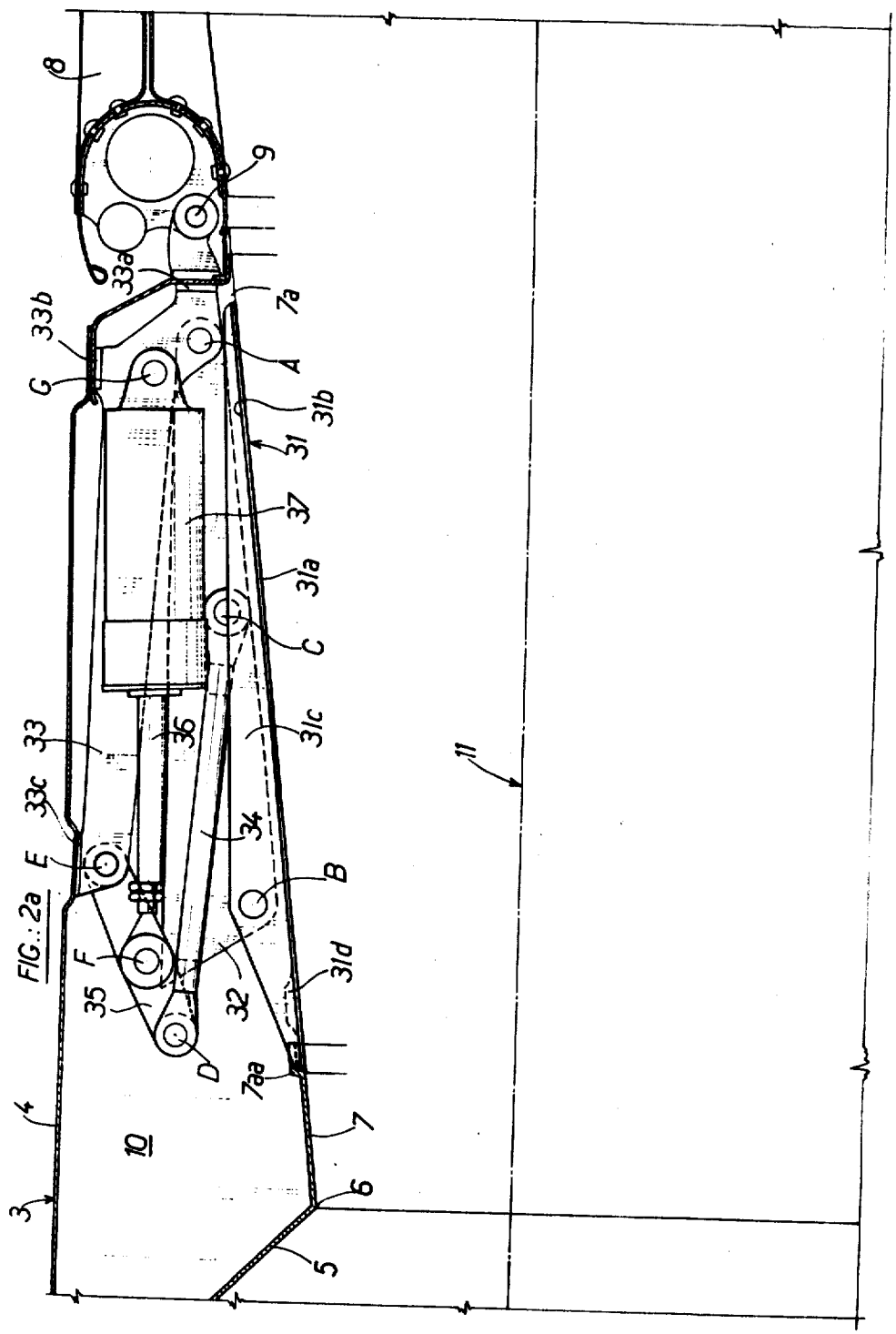

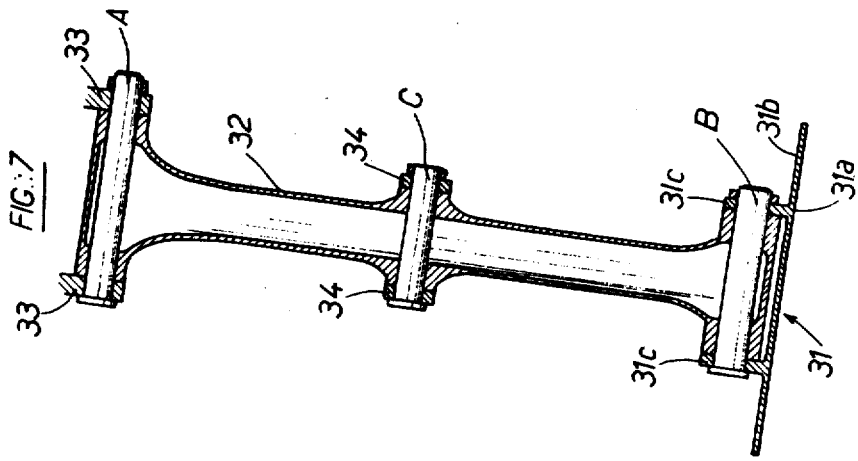
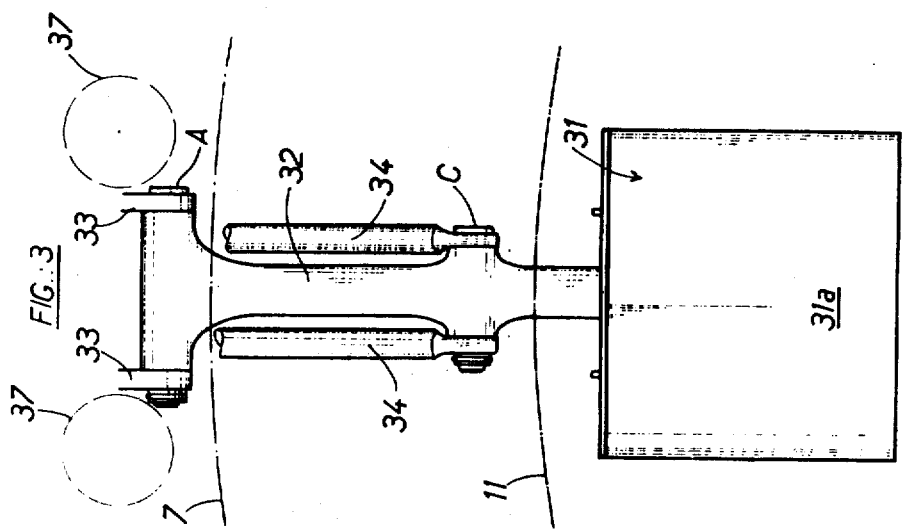

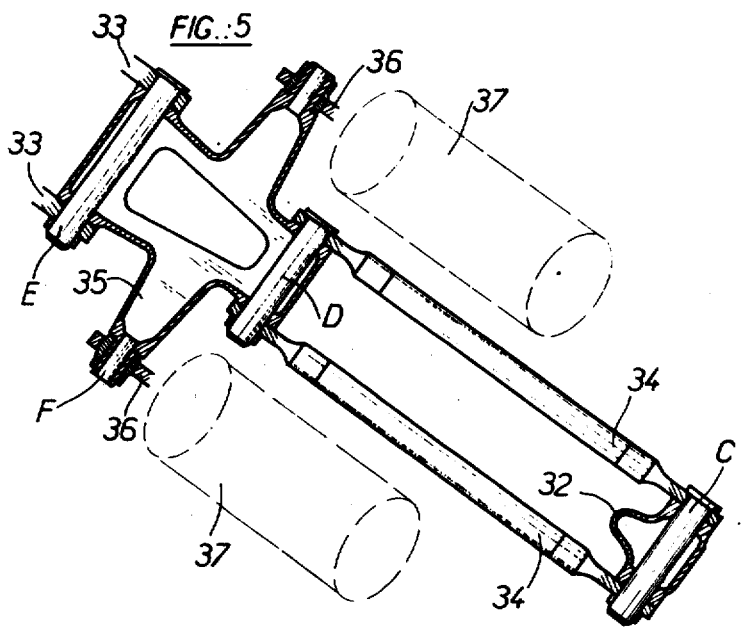
FIG.:5
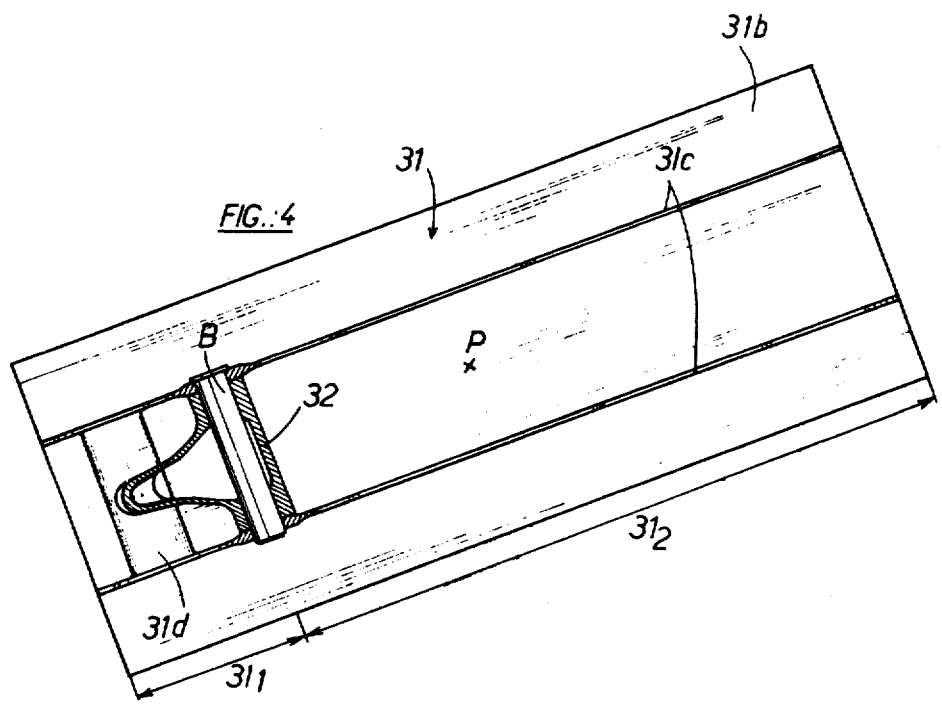
FIG.:4

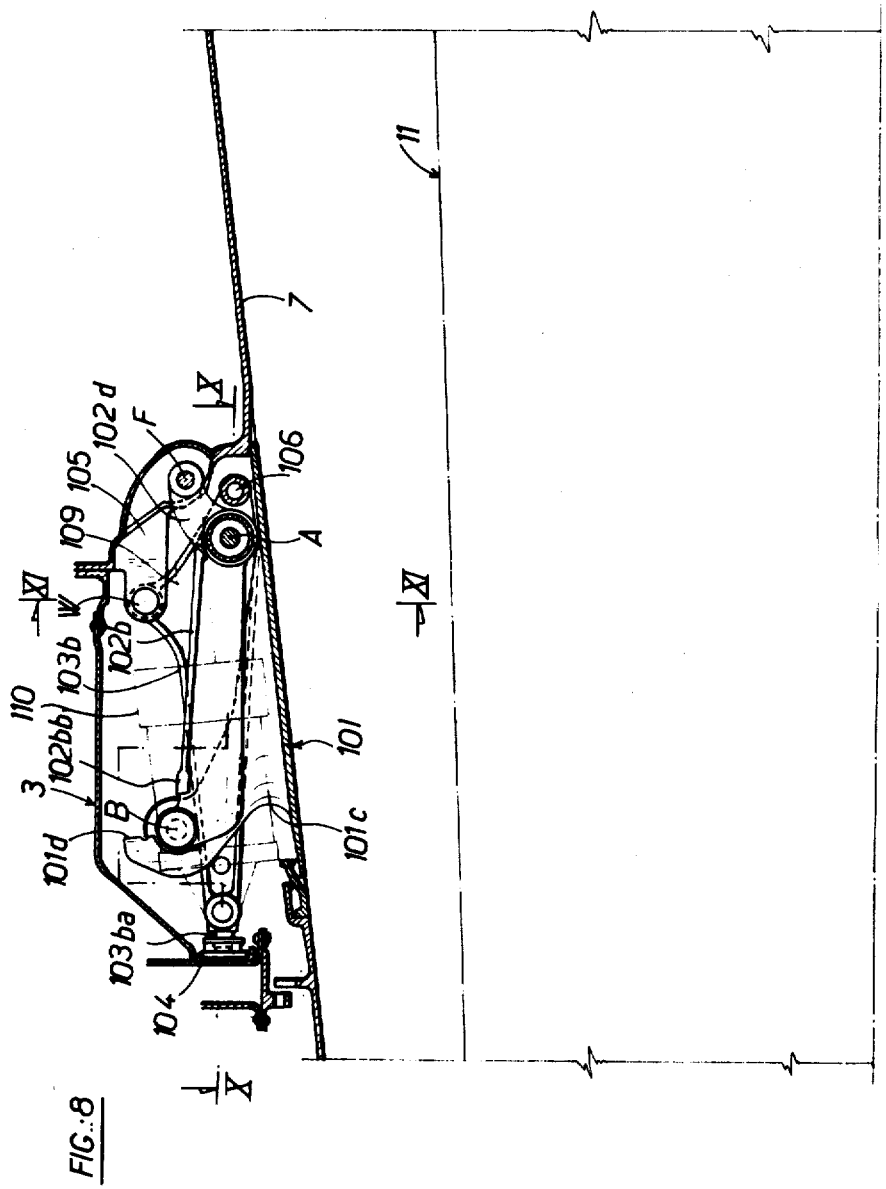

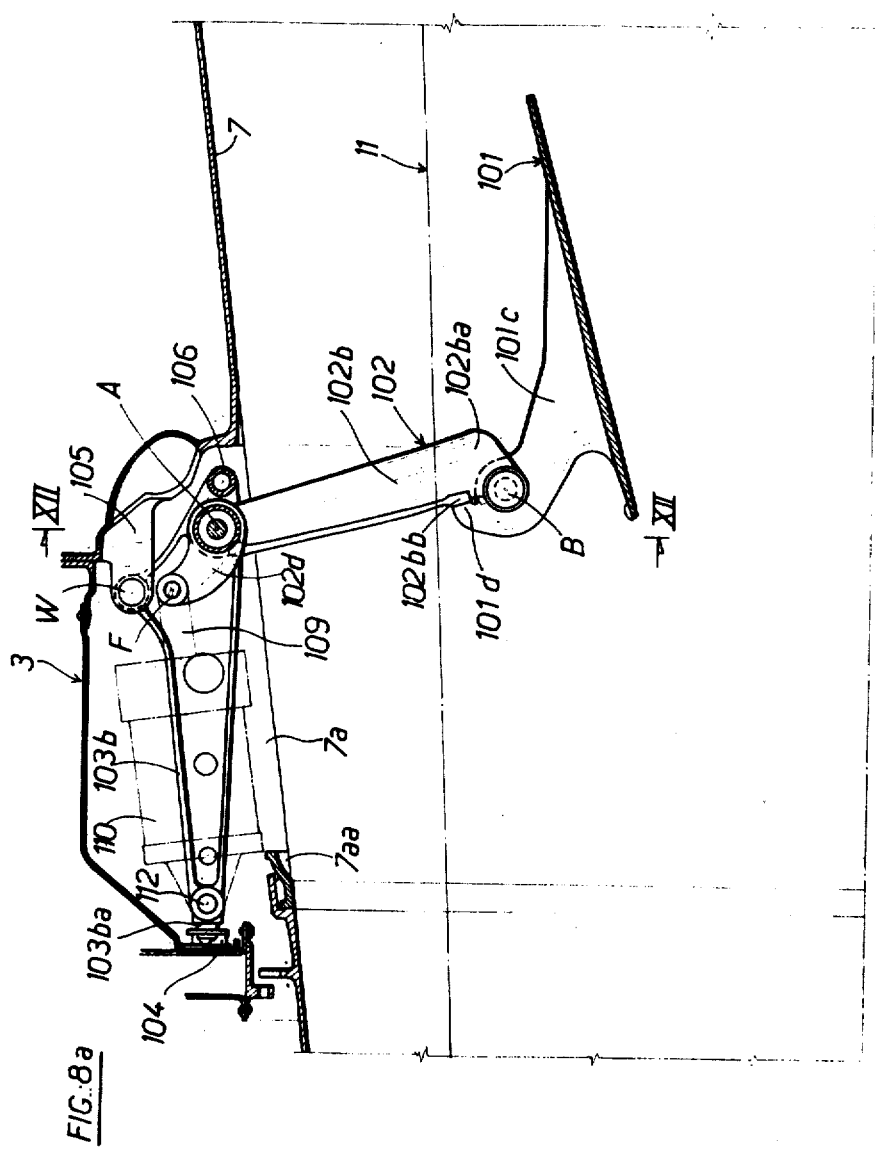

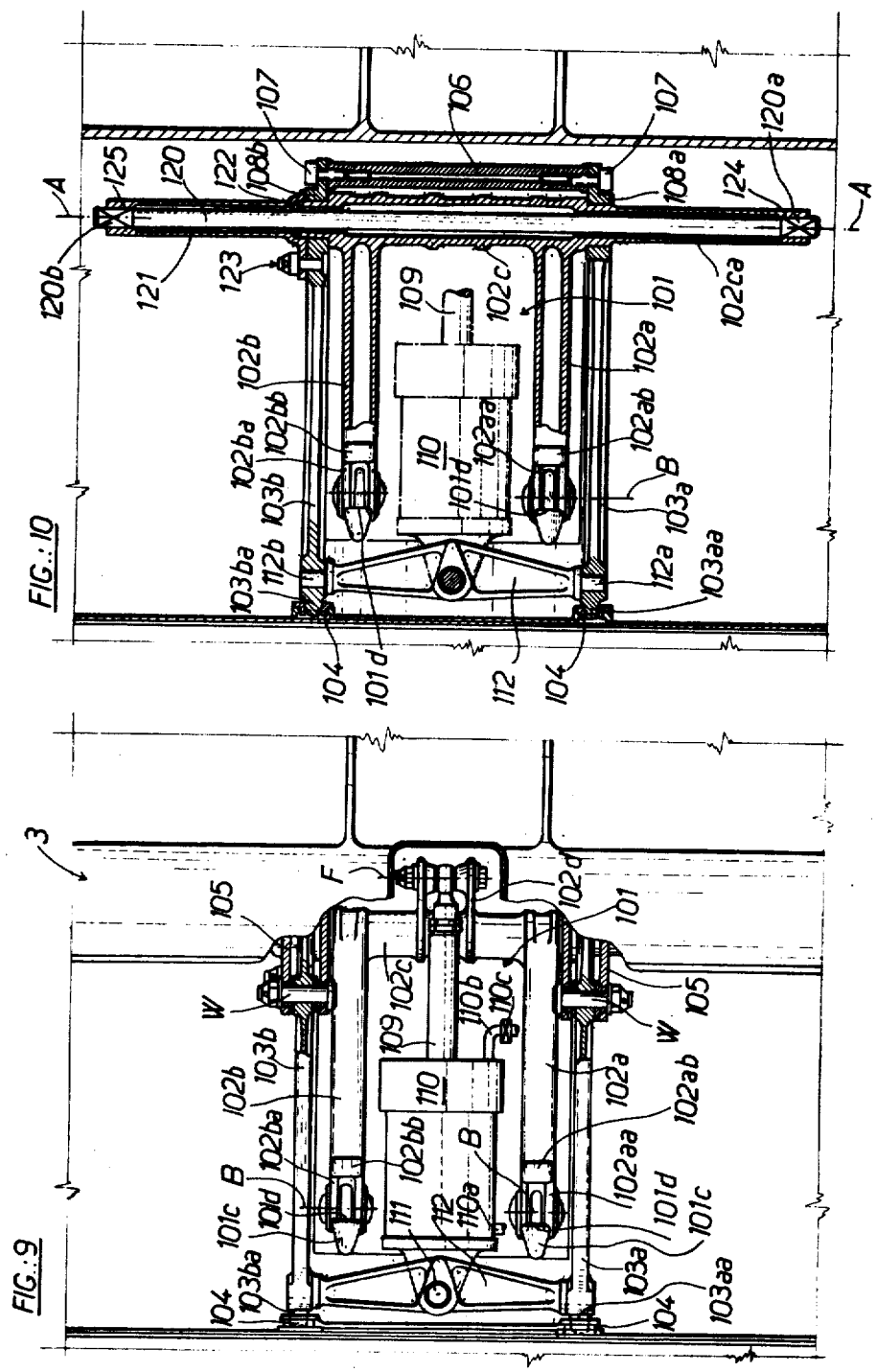

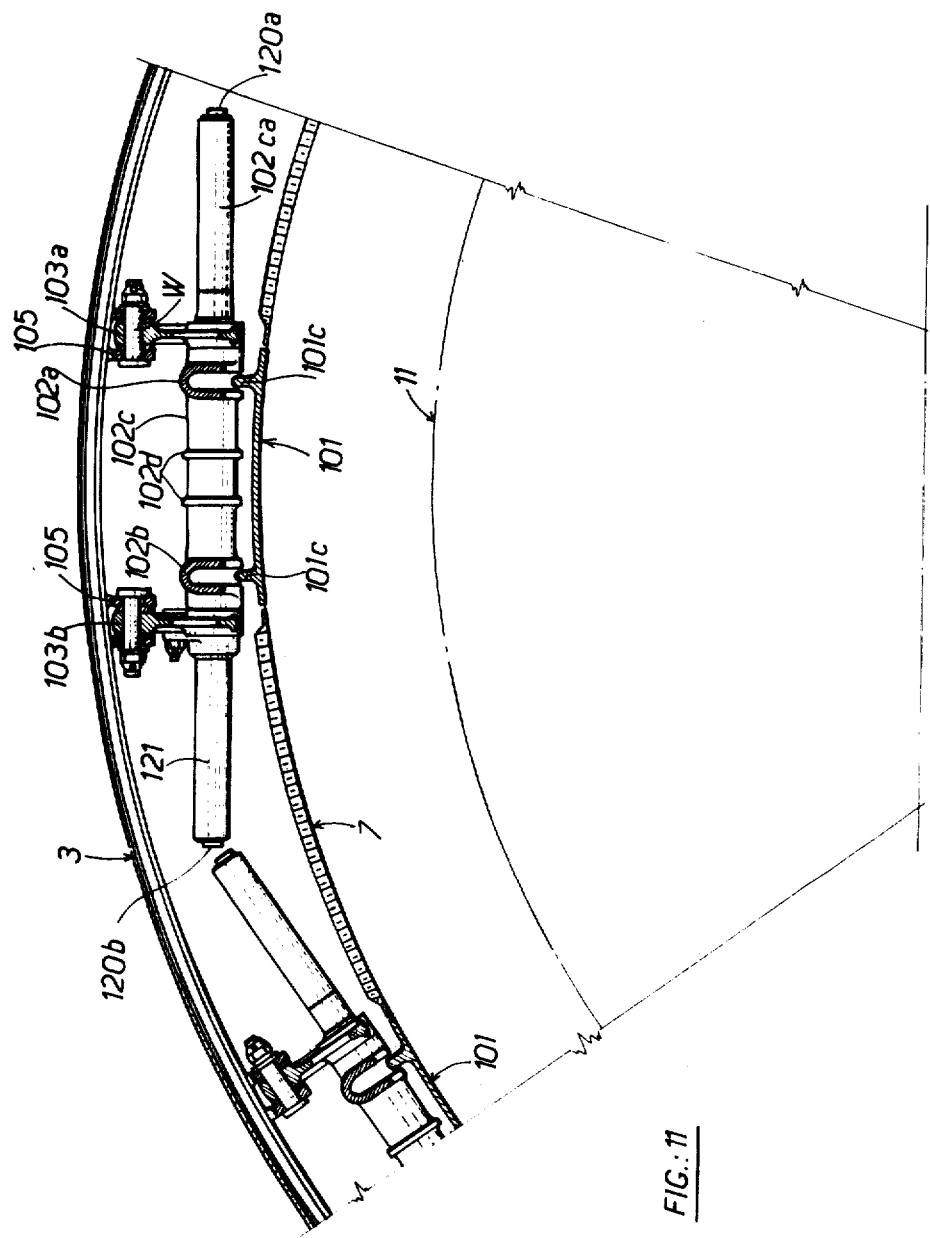
FIG.:11

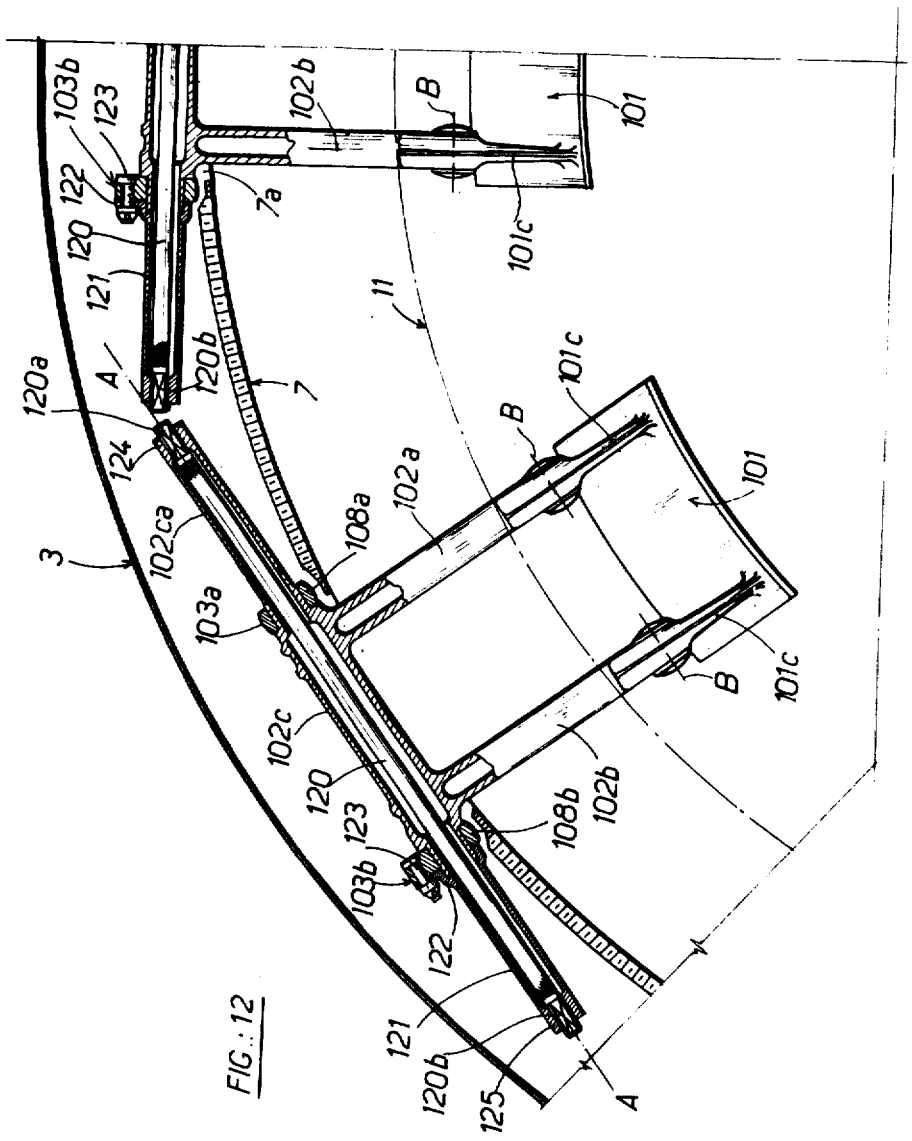

DEVICE FOR DAMPING THE NOISE PRODUCED B A GAS JET ESCAPING FROM A DUCT

This invention relates to a device for damping the noise produced by a gas jet escaping from a duct such as a jet pipe or nozzle, of the kind which comprises, distributed about the jet whose noise is to be damped, a plurality of silencer elements each of which comprises, carried by a holder or supporting element which can be actuated under the action of a control device, a silencer element or scoop which can be moved, under the action of said control device, between an operative position in which it projects with negative incidence into said jet, and an inoperative position in which it is retracted from said jet.

The invention relates more particularly although not exclusively to the damping of the noise produced in operation by the propulsion jet escaping from the nozzle system of a jet engine fitted to an airborne vehicle such as an aircraft, in particular at the time of take-off and climb-out.

In their operative position, the silencer elements exert a "peeling" effect upon the jet, which results in the separation, partially at any rate, of the peripheral layer from the central part or core of the jet, this contributing, as those skilled in the art will appreciate, to improved mixing between the gas of the jet and the environment, generally speaking air, which surrounds it, and thus to attenuation of the noise emitted by the jet. In their inoperative position, the silencer elements are retracted away from the jet, so that there is no loss of thrust.

The introduction of a silencer of this type meets with certain difficulties, however, from the point of view of the control of the silencer elements. As those skilled in the art will appreciate, because the silencer elements project into the jet at a negative angle of incidence, the lift produced by the jet upon the silencer elements is likewise negative. In other words, under the action of the aerodynamic forces to which they are subjected, the silencer elements, when in the operative position, tend to penetrate further into the core of the jet. The result is that to keep them in silencer operative position and to retract them from their operative position into the inoperative position involves overcoming the action of the jet, and this means that in order to control them, control devices (in particular jacks) which are capable of developing substantial forces and are therefore heavy, bulky and expensive, are required.

The object of the invention is to reduce these drawbacks, at least to a substantial extent.

In accordance with a first aspect of the invention, in certain at least of the silencer elements, the silencer element is arranged to pivot freely on its holder element about an axis which divides said silencer element, when considered in its operative position, into two sections, an upstream one and a downstream one, such that the center of pressure of silencer element is located in its downstream section, with the result that the said silencer element is subjected to a thrust tending to pivot it about said axis in a manner such as to reduce its angle of incidence, considered in absolute terms, in the jet, said holder element having a portion which forms a stop designed to cooperate with a corresponding mating portion integral with said silencer element, thus to limit the pivoting motion of said silencer element about said axis in said direction.

The result of this arrangement is that on passage from its inoperative position to its operative position or vice versa, the silencer element enters or leaves the jet with its downstream section; that in certain at least of its intermediate positions it is free to align itself with the streamlines of the jet flow; and that in the operative position it adopts in the jet an orientation such that the peeling effect is produced. When, the silencer element is aligned with the jet streamlines, its lift is substantially zero, and this means a considerable reduction in the force exerted at the control device associated with said silencer element.

In accordance with another aspect of the invention which could, furthermore, be applied independently of the first, the holder or support element is articulated to a fixed structure and is actuated through the medium of a toggle mechanism with two segments which are articulated on the one hand to one another and on the other hand respectively to said fixed structure and said holder element, said toggle mechanism, when the holder element occupies a position corresponding to the operative position of the silencer element, exhibiting a configuration such that the two articulated sections are disposed in extension of one another.

In this arrangement, the two sections operate in the tensile mode, transmitting directly to the fixed structure the whole of the force to which the silencer element is subjected. The control device or jack associated with the latter is then not subjected to these loads.

In accordance with another aspect of the invention, which can be applied independently of the foregoing aspects, a silencer element can be associated with means for elastically biasing said element towards its inoperative position, said means reinforcing the action the normal control device which acts upon the holder element of the silencer element.

In the case where said holder element is articulated to a fixed structure about a pivot axis, said biasing means can advantageously comprise an element such as a section of cable which is subjected to elastic torsional loading about said axis.

This arrangement has the advantage that at all times it enables the silencer element to be returned to the inoperative position, even if the aforesaid normal control device should fail.

The invention likewise relates to propulsion nozzles, in particular in turbojet (gas turbine jet) engines, which are equipped with an improved silencer of the aforedescribed kind. In the case where the nozzle is of the dual-flow or by-pass type, comprising a primary nozzle through which the jet, whose noise is to be damped, is discharged, and a secondary fairing of larger cross-sectional area than the primary nozzle, said fairing extending downstream beyond the nozzle exit orifice, the silencer elements or scoops, and their holder elements, can advantageously be designed so that in the inoperative position they retract into said fairing.

The description which now follows and which relates to the accompanying drawing will indicate by way of example how the invention may be carried into practice.

In the drawings:

FIG. 1 is a schematic longitudinal half-section through a propulsion nozzle equipped with a known type of silencer using silencer elements of the deflector or scoop type;

FIG. 2 is a schematic longitudinal half-section through a portion of a propulsion nozzle equipped with silencer elements of the deflector or scoop type, in accordance with a first embodiment of the invention, the silencer elements being shown in the operative configuration;

FIG. 2a is a view similar to that of FIG. 2, this time, however, with the silencer elements in the inoperative configuration;

FIG. 3 is an end elevation, taken in the direction of the arrow III of FIG 2, of the silencer, with the nozzle lifted away;

FIGS. 4, 5, 6, 7 are sectional views of the silencer, respectively on the lines IV—IV, V—V, VI—VI and VII—VII of FIG. 2;

FIG. 8 is a schematic longitudinal half-section of a portion of a propulsion nozzle equipped with silencer elements of the deflector or scoop type, in accordance with a second embodiment of the invention, the silencer elements being shown in the inoperative configuration;

FIG. 8a is a view similar to that of FIG. 8, this time however with the silencer elements in the operative configuration;

FIG. 9 is a developed plan view, partially sectioned and cut away, of the device shown in FIG. 8;

FIG. 10 is a sectional view on the line X—X of the device shown in FIG. 8;

FIG. 11 is a sectional view on the line XI—XI of the device shown in FIG. 8;

FIG. 12 is a sectional view on the line XII—XII of the device shown in FIG. 8a.

In FIG. 1, a propulsion nozzle, which constitutes the rear terminal part of a jet engine, has been illustrated. As is often the case in high-thrust jet engines, such as those installed in certain kinds of supersonic aircraft, said nozzle is of the dual-flow or by-pass type, with a primary nozzle 1 of fixed or variable exit section 2, and a secondary fairing 3 located coaxially about the primary nozzle and extending beyond the exit section thereof in the downstream direction. The fairing 3 is delimited externally by a wall 4 and internally by a convergent-divergent wall 5 the throat and divergent portion of which have been respectively marked 6 and 7. Control flaps 8 articulated at 9 may possibly be used to extend said fairing towards the rear. These flaps may be designed to operate automatically or may be under pilot control. The walls 4 and 5 delimit between them a fixed box structure 10.

In operation, the hot gases which leave the primary nozzle 1, still under fairly high pressure, in the direction of the arrows $f$, form a noisy jet the boundary of which has been marked by the reference 11. The annular space 12, defined between the internal wall of the secondary fairing and the external wall of the primary nozzle followed by the boundary 11 of the primary jet, passes a secondary airflow indicated by the arrow F.

A known type of silencer which will effectively damp the noise emanating from the jet $f$, comprises, distributed uniformly around the jet, a plurality of silencer elements each of which comprises a deflector element or scoop 13 carried by a holder element 14. The latter is constituted by a bellcrank articulated at its angle about a pivot 15 carried by a yoke 16 attached to the fixed structure of the fairing. The shorter arm of the bellcrank is itself articulated at its end 17 to the end of the rod 18 of an actuater 19 such as a jack, housed in the box structure 10 and articulated at 20 to the fixed structure of the fairing.

Under the action of the jacks 19, the silencer elements 13 can be moved between two terminal positions respectively indicated in broken line and full line, one being operative or silencing position and the other the inoperative or cruising position. Electrical limit contacts 21, 22 provide the pilot with an indication that the silencer elements have reached one or the other of said positions. In the operative position pressure is maintained in the jacks.

In this position, for example at take-off and during the climb-out phase, the silencer elements 13 are deployed (at 13a) in order to project into the primary jet with a negative incidence $\alpha$. They thus tap off or "peel off" a certain fraction of said jet which they deflect in the manner of scoops, into the annular space 12. The process of mixing between the gas of the jet and the secondary air flowing through the space 12 is consequently vigorously promoted, this, as those skilled in the art will be aware, leading to the creation of a particularly marked silencing effect.

In the inoperative position, for example during cruising, the silence elements 13 and their holder elements are fully retracted into cut-outs 7a formed in the wall of the divergent portion 7, the continuity of which is thereby re-established so that no loss of thrust occurs.

As stated hereinbefore, due to the fact that, in the operative position they have a negative incidence in the jet, the silencer elements 13 are subjected to a resultant thrust R which tends to force them still further into the body of the jet. The result is that considerable forces are transmitted to the control or actuating devices (in particular the jacks 19) associated with these silencer elements. Keeping these elements in their operative position, and returning them to the inoperative position, thus require the exertion of considerable forces, and this constitutes a drawback both from the engineering point of view and from the economic point of view, a drawback which the present invention seeks to overcome.

In FIGS. 2 to 7, a dual-flow nozzle equipped with an improved deflector-type silencer in accordance with a first embodiment of the invention, has been illustrated. In particular, in FIGS. 2 and 2a, there can be seen the secondary fairing 3 including its divergent portion 7, as well as the boundary 11 of the primary jet. As before, said fairing delimits, between its internal wall and its external wall, a fixed box or structure casing 10.

Uniformly distributed around the jet (see FIG. 3), and numbering 10 for example, are the silencer elements which comprises deflectors or scoops 31 carried by holder elements 32, which scoops can either occupy an operative position (see FIG. 2) in which they project into the jet with a negative angle of incidence $\alpha$, for example of the order of 20°, or an inoperative position (see FIG. 2a) in which they are retracted, along with their holder elements, into the secondary fairing 3. Each silencer element 31 has a free upstream edge and a free downstream edge, considered in relation to the direction of the gas flow. In the operative position, said upstream edge is disposed nearer the center line of the jet then is said downstream edge.

As before, cut-outs 7a formed in the divergent wall portion 7 and matching the contour of the silencer elements 31, are closed off when said elements are in the inoperative position, thus re-establishing continuity in said wall. Said cut-outs can advantageously comprise, at least at their upstream ends, a stepped-back edge 7aa against which a corresponding edge of the relevant silencer element can seat.

Yokes 33, equal in number to the number of silencer elements 31 and each comprising two flanges fastened at 33a, 33b, 33c to the secondary fairing, form a fixed reference structure.

The holder or supporting element 32 of the silencer element 31 is constituted by a triangular-section arm (see FIG. 6) hingedly connected at one of its ends to the yoke 33 through a pivot axis A mounted between the two flanges of said yoke.

The silencer element 31 is constituted by a substantially rectangular plate having two opposite faces, namely a face 31a disposed towards the interior of the jet and a face 31b disposed towards the exterior and exhibiting two ribs 31c (see FIG. 4). As FIGS. 2, 4 and 7 show, the said silencer element is arranged to pivot on its holder element 32 about a pivot B carried by the ribs 31c. At its ends adjacent the element 31, the holder element 32 has a portion 32a serving as a stop and designed to cooperate with a mating stop formation 31d carried by the upstream part of the external face 31b of said silencer element, in order thus to limit in one direction the pivoting motion of the silencer element 31 about the axis B. At an intermediate point on the holder element or supporting arm 32, there are articulared, by one of their ends in each case and about a pivot C, two links 34 which are disposed parallel to one another at either side of the holder element 32.

At their respective other ends, these links are articulated about a pivot D to one of the ends of a lever 35 which is wide and short in shape, the lever itself being articulated at its other end to a pivot E carried by the two flanges of the aforesaid yoke 33.

The links 34 on the one hand, and the lever 35, on the other, constitute the two articulated sections of a toggle mechanism designed in order to occupy its deadpoint position when the silencer element 31 is in its operative position. In this position, the two sections of the toggle lever mechanism are disposed in extension of one another (see FIG. 2).

Each of the assemblies constituted by a silencer element 31, its holder element 32, its toggle mechanism 34, 35 and its control or actuating arrangement 36, 37, forms an independent group. Instead of two small jacks 37, it would be equally possible to employ a single jack of larger size.

When the silencer element or scoop 31 projects into the jet, it experiences a resultant thrust R which is exerted at its center of pressure P. An important feature of the invention resides in the choice of the position of the pivot axis B in relation to said center of pressure.

In FIGS. 2 and 4, it can be seen that the axis B divides the silencer element 31 into an upstream section $31_1$ and a downstream section $31_2$, and that the location of said axis is selected so that the center of pressure P is contained in said downstream sections $31_2$, substantially downstream, in fact, of the axis B. Under these circumstances, if we call $R_1$ and $R_2$ the pressure forces respectively exerted at the centers of pressure $P_1$ and $P_2$ of the upstream $31_1$ and downstream $31_2$ sections of the silencer element 31, and $L_1$ and $L_2$ the distances respectively separating said centers of pressure from the axis B, then it will be seen that the relationship $R_2L_2 > R_1L_1$ is applicable. The moment of the force $R_2$ exerted upon the downstream section $31_2$ of the silencer element 31 thus predominates, so that said element tends to rotate about the axis B in a direction such as to reduce its angle of incidence $\alpha$ in the jet, said angle being considered in terms of absolute value. In addition, by virtue of its drag component, the resultant force R also exerts a torque tending to rotate the assembly 31, 32 in the downstream direction about the axis A.

Let us now consider the behavior of the assembly 31, 32 and its control arrangement, assuming first of all that the silencer elements 31 are to be moved from their inoperative position into their operative position. The jacks 37 having been actuated in such a manner as to retract their rods 36, the holder element 32, which is attached to said rods through the medium of the lever 35 and the links 34, rotates in the downstream direction about the axis A, aided in this movement by the aforesaid drag component. It arrives in the final position when the links 34 are disposed in extension of the lever 35. The toggle mechanism 34, 35 is then in its deadpoint position and the holder element held by the links 34 and the lever 35 which operate in tension between the pivots E and C. The two jacks 37, whose piston rods have been retracted, therefore do not have to apply any force in order to maintain the assembly 31, 32 in its operative position.

At the same time, the silencer element 31 automatically rotates, as we have seen from the foregoing, about its axis B, until its stop 31d comes into contact with the stop 32a fixed to the mounting 32. It will be observed that this stop 32a is angled so that the negative angle of incidence $\alpha$ finally adopted by the silencer element is conductive to the production of the desired "peeling" effect. The assembly 31, 32 then occupies its operative position, as indicated by the reference I in FIG. 2.

During the reverse maneuver, the jacks 37 are actuated so that their rods 36 extend and the lever 35 pivots in the upstream direction about the fixed axis E. The axes F and D describe circular arcs centered on E. The holder element 32 likewise pivots in the upstream direction about the axis A, under the pull of the links 34.

At the start of this movement, the silencer element 31 remains at rest against its stop 32a until it has reached the position II (see FIG. 2) such that its lift in the jet is zero.

The intermediate position III is a later position in which the silencer element 31, still located within the body of the jet, is no longer against the stop but instead can pivot freely. It then aligns itself with the jet streamlines and, consequently, remains in a position of substantially zero lift so that the force which the jacks 37 have to exert is substantially reduced.

FIG. 2a illustrates the final retracted position. The piston rods 36 of the jacks 37 have reached full extension while the lever 35, the links 34 and the holder element 32 have been retracted in the upstream direction into the interior of the box structure 10. Shortly before this happens, the upstream edge of the silencer element 31, which can tilt freely, will have come into contact with the stepped-back edge 7aa of the cut-out 7a in the divergent portion 7. The downstream edge of the silencer element seats against the flanges of the yoke 33 but could equally seat against a rear edge similar to the stepped edge 7aa of the cut-out in the divergent portion. The silencer element 31 thus restores continuity to the wall of the divergent portion, for unsilenced flight.

It will be observed that unlike the known device shown in FIG. 1, in which the entry of the silencer element 13 into the jet, and its exit therefrom, are effected with the upstream end of said element, said entry and exit take place, in the case of the silencer element of the present invention, with the downstream end of the element.

Summarizing, in the position I shown in FIG. 2, the force on the jacks 37 is zero because the silencer element 31 merely exerts a tractive effort on the elements 34 and 35 secured to the fixed pivot axis E. Between the positions I and II, this force remains small because of the progressive movement of said silencer element into a low-lift attitude. Finally, beyond the position II, the silencer element remains in the feathered attitude (and thus in a zero lift position) until its final retraction into the wall of the divergent portion 7.

Thus the silencer element 31, which is subjected in the jet to a substantial force, can be operated by means of a low-power control system which is therefore lighter, less bulky and less expensive that that necessary heretofore. It will be observed, in particular, that the longitudinal and circumferential dimensions of this control system are substantially equal to those of the silencer element and that it therefore leaves a substantial amount of space available for other devices which may be required.

In FIGS. 8 to 12, a dual-flow nozzle equipped with a deflector or scoop silencer in accordance with a second embodiment of the invention, has been illustrated.

The silencer elements have been marked by the reference 101. Each of them is carried by a holder element 102 comprising two hollow parallel arms 102a, 102b attached together at one of their ends in each instance by a hollow sleeve 102c and terminating at their other ends in each instance in a yoke 102aa, 102ba.

Each of the holder elements 102 is articulated about a geometric axis A to a fixed reference structure comprising, in equal number to the number of said holder elements, yokes whose flanges are constituted by longitudinal sections 103a, 103b provided with peripheral ribs and apertured webs. These sections are positioned at the front by centring spigots 103aa, 103ba, engaging in locations 104 integral with the secondary fairing 3. They are fixed at the rear by pivots W carried by yokes 105 which are likewise integral with said fairing. Their spacing is maintained at the rear end by spacers 106 fixed by screws 107 (see FIG. 10).

Physical means defining the geometric axes A exists in the form of two bearings 108a, 108b (see FIGS. 10 and 12) respectively carried by the sections 103a and 103b, in which the hollow sleeve 102c is journalled. Said sleeve carries at its central zone two flanges constituting a yoke 102d holding a pivot F for the end of the rod 109 of a control or actuating jack 110. It will be observed that the sleeve 102c is extended, beyond the bearing 108a in the form of a cantilever stub 102ca, fixed to said sleeve, by welding for example.

In FIG. 9, the references 110a, 110b have been used to indicate the delivery and return lines carrying the fluid to and from the jack.

Associated with each mounting 102 is a jack 110 arranged between the sections 103a, 103b, whose cylinder is hingedly connected through a joint 111 to a crosspiece 112 itself pivotally assembled through two journals 112a, 112b in bearings formed in said sections.

Each of the silencer elements 101, is equipped, on that of its faces disposed towards the exterior of the jet 11, with two ribs 101c respectively articulated about a pivot axis B to the terminal yokes 102aa, 102ba, of the arms 102a, 102b. At that of its ends adjacent the rib 101c, each of the arms has a portion 102ab, 102bb doing duty as a stop which cooperates with a mating stop 101d carried by the rib 101c.

As in the embodiment hereinbefore described, the position of the axis B is so chosen, in relation to the position of the center of pressure of the jet of the silencer elements 101, that said silencer elements pivot about said axes and align themselves with the jet streamlines, that is to say in a position of substantially zero lift in which the force exerted by the jacks 110 is substantially reduced, said pivoting motion being limited however, when the silencer is in the operative configuration, by contact between the portions 101d on the ribs, and the portions 102ab, 102bb on the supporting arms 102a, 102b (see FIG. 8a).

Associated with each silencer element 101, is a safety device comprising means for elastically biasing said element towards its inoperative position, as shown in FIGS. 8 and 11.

Said safety device, visible in particular in FIGS. 10 to 12, comprises more specifically a torsion spring, which is preferably formed by a section of metal cable 120 extending coaxially to the pivot axis A of the holder element 102, inside a sheath formed by the sleeve 102c, its extension 102ca and an auxiliary sleeve 121. The latter has a flange 122 coaxial with the bearing 108b, through which said auxiliary sleeve can be attached to the section 103b using bolts 123. The flange 122 is cut away (see FIG. 10), in order not to interfere with the positioning of the screws 107. The internal bore of the sleeves 102c, 102ca and 121, is in each case of circular cylindrical section, except at the respective free ends of the sleeves 102ca and 121, where locations 124, 125 of polygonal sections, for example square, are formed which are smaller than the cylindrical section.

The cable section 120 has two polygonal tips 120a, 120b designed to fit in the aforementioned locations. With the sleeve 121 dismantled, the cable section 120 is engaged in the bore in the sleeves 102c, 102ca, the tip 120a fitting in the location 124 in such a fashion that it slightly projects. The sleeve 121 is then passed over the cable section 120. The tip 120b subsequently enters its location 125 where it likewise slightly projects. Finally, the flange 122 is fixed to the section 103b by the bolts 123.

One of the ends of the cable section 120 is thus secured to the holding element 102 whilst the other is secured to the section 103b which forms part of the reference structure 103a, 103b.

The cable section 120 has a circular section which is smaller than that of the bore in the sleeves so that it can, in consequence, twist freely. Its total length is slightly longer that that of the assembly of the three sleeves in order to take account of the reduction in length which occurs with torsional loading. It will be observed in this context that the use of a cable section as a torsion spring is to be preferred to the use of a torsion bar. As those skilled in the art will appreciate for the same stress, a flexible cable experiences a larger angular deflection. In addition, the risk of rupture of a cable is less than that which is present in a torsion bar, in view of the fact that an incipient crack in a strand ultimately simply means the failure of the particular strand involved and not of the whole cable.

The relative angular positions of the two tips is chosen in such a way that when the silencer element 101 is in its inoperative position, a residual torsional torque remains which tends to keep the silencer element in this position.

In operation, when the silencer is actuated, each silencer element 101, is introduced into the jet under the action of its control or actuating jack 110. The sleeves 102c, 102ca then rotate about the axis A in relation to the sleeve 121 which remains fixed. The cable 120 whose tips 120a, 120b are respectively secured to the pivoting sleeve 120ca and the fixed sleeve 121, is thus subjected to pure torsional loading and distorts elastically, thus accumulating a certain potential energy. It will be observed that because of the articulated assembly of the silencer element 101 on its holder element 102, the thrust exerted by the jet on this silencer element (said thrust in all cases tending to place said element in its operative position) is small. The jack 110 assembled in the yoke 102d therefore simply has to furnish the force required elastically to twist the cable 120.

When the silencer is no longer required, the jack 110, by exerting a thrust on the yoke 102d, cooperates with the cable 120 to return the silencer element 101 to its inoperative position.

As we have seen, the energy required for this purpose is likewise low because the silencer element 101 is rapidly placed in the zero lift position.

The cable 120 thus restores the energy which it has stored during the previous maneuver. In order to attenuate the shock occurring when the silencer element 101 comes up against its stop in the retracted position in the cut-out 7a formed in the divergent nozzle portion, a one-way restrictor 110c can be arranged in the discharge line 110b of the jack in order to throttle the discharge of fluid from the jack, thus to make it operate as a damper.

In normal operation, the power of the jack 110 and that of the torsion cable 120 complement one another to return the silencer element 101, 102 to its inoperative position. If the connection between the jack 110 and the holder element 102 should fail, or if there should be a failure in that part of the supply to the jack which is responsible for placing the silencer element 101 in the operative position in the jet, the cable 120, to which has been imparted an initial elastic torsion, maintains the silencer element 101 in its inoperative position.

In the event of a failure to that side of the jack supply responsible for placing the silencer element 101 in the inoperative position, the torsion cable 120 on its own returns the silencer element 101 to said inoperative position.

In the event of rupture of the cable 120, the jack 110 on its own returns the silencer 101 element to its inoperative position.

Thus, extremely reliable dual control, operative to return the silencer elements to the retracted position, is obtained. The risk of unwanted jamming of the silencer elements 101 in the jet as a consequence of some kind of fault in their control arrangements, this being a situation which could give rise to substantial drag losses, is according substantially eliminated. This favorable factor can thus be taken into account in planning the aircraft fuel consumption for a flight.

From the operating point of view, the silencer element 101, its holder element 102, its control jack 110 and its elastic biasing device 120, are grouped in a self-contained unit, with the exception of the jack supply. This unit is readily accessible from the exterior of the divergent portion 7 and is therefore easy to maintain.

It will be appreciated that the embodiments described are merely examples and are open to modification in various ways without in so doing departing from the scope of the invention as defined by the appended claims.

We claim:

1. A silencer device for damping the noise produced by a gas jet escaping from a duct, comprising:
   a fixed structure;
   a plurality of silencer elements distributed about said jet, each such element having a free upstream edge and a free downstream edge relative to the direction of the gas jet;
   control means for moving each of said silencer elements between an operative silencing position in which said silencer element projects with negative incidence into said jet in the manner of a scoop with said free upstream edge disposed nearer the center line of the jet than is said downstream edge, and an inoperative retracted position, said control means including, for each of said silencer elements:
   supporting means for supporting said element in said positions mounted for movement with respect to said fixed structure and carrying the silencer element pivotable thereon about an axis located intermediate the free edges of said element with the center of pressure of the jet impinging on the element at a point downstream of said axis, whereby in use the silencer element is subjected to a pressure thrust tending to pivot it about said axis in a direction to reduce said negative angle of incidence in the jet, said supporting means including stop means thereon for engaging a cooperating stop portion on the silencer element, thereby to limit the pivotal motion of said silencer element about said axis in said direction and determine the incidence angle of said element when in its projected operative position; and
   actuating means for moving said support means with respect to said fixed structure and thus move said silencer element between its operative and inoperative positions.

2. A silencer device as claimed in claim 1 wherein said control means further include spring means for biasing said silencer element at least partially away from its projected operative position.

3. A silencer device as claimed in claim 2 wherein said spring means biases said silencer element at least to a position at which said stop means and cooperating stop portion are out of engagement and said element is free to assume a position of neutral incidence in said jet.

4. A silencer device as claimed in claim 1 wherein said support means is hingedly connected to said fixed structure, and said actuating means includes a toggle lever comprising two lever arms which are articulated at one end to each other and at the other end respectively to said fixed structure and said support means, said toggle lever having its arms in aligned extended relation when said supporting means supports said silencer element in its projected operative position.

5. A silencer device for damping the noise produced by a gas jet escaping from a duct, comprising:
a fixed structure;
a plurality of silencer elements distributed about said jet;
actuating means for moving each of said silencer elements with respect to said fixed structure between an operative silencing position in which it projects into said jet and an inoperative retracted position; and
spring means for biasing said silencer element at least partially away from its operative projected position in the event of failure of said actuating means.

6. A silencer device as claimed in claim 5 in which each of said silencer elements is carried by a supporting means hingedly connected to said fixed structure through a pivot axis, and said spring means includes an element which experiences torsion stress around said pivot axis.

7. A silencer device as claimed in claim 5 wherein each silencer element in its projected operative position is disposed with negative incidence in said jet in the manner of a scoop with its free upstream edge extending nearer the center line of the jet than its free downstream edge.

8. A silencer device as claimed in claim 7 wherein said spring means biases said element at least to a position in which said element has substantially neutral incidence in said jet.

9. A silencer device as claimed in claim 5 wherein said actuating means comprises a fluid-operated jack, said jack being provided with restrictor means adapted to throttle the discharge of fluid from the jack when the silencer element is moved from its operative position into its operative position.

10. A silencer device for damping the noise produced by a gas jet escaping from a duct, comprising:
a plurality of silencer elements distributed about said jet;
control means for moving each of said silencer elements between an operative silencing position in which it projects into said jet and an inoperative retracted position, said control means including, for each of said silencer elements:
supporting means carrying said silencer element and being hingedly connected to said fixed structure through a pivot axis;
actuating means for moving said supporting means with respect to said fixed structure to thereby move said silencer element between its operative and inoperative positions: and
spring means for biasing said silencer element at least partially away from its operative projected position including a torsion spring coaxially mounted about said pivot axis with one end secured to said fixed structure and the other end secured to said supporting means.

11. A silencer device as claimed in claim 10 wherein said torsion spring comprises a cable section.

12. A silencer device as claimed in claim 10, wherein said supporting means includes a hollow sleeve portion mounted coaxially about said pivot axis, and said torsion spring extends inside said sleeve and has one of its ends secured to said sleeve.

13. A silencer device as claimed in claim 12 wherein said fixed structure comprises a hollow auxiliary sleeve mounted coaxially about said pivot axis as an extension of said first sleeve, and said torsion spring likewise extends inside said auxiliary sleeve and has its other end secured thereto.

14. A silencer device as claimed in claim 13 wherein the internal surface of at least one of said sleeves is of circular cross-section over part at least of the length thereof and includes a portion of polygonal section for engagement with correspondingly shaped tip at one end of the torsion spring.

15. A silencer device for damping the noise produced by a gas jet escaping from a duct, comprising:
a fixed structure;
a plurality of silencer elements distributed about said jet, said silencer elements having each a free upstream edge and a free downstream edge relative to the direction of the gas jet;
control means for moving each of said silencer elements between an operative silencing position in which said silencer element projects with negative incidence into said jet in the manner of a scoop and in which said free upstream edge is disposed nearer the center line of the jet than is said downstream edge, and an inoperative retracted position, said control means including, for each of said silencer elements:
supporting means carrying said silencer element and hingedly connected to said fixed structure; and
actuating means for moving said supporting means with respect to said fixed structure to thereby move said silencer element between its operative and inoperative positions, said actuating means including a toggle lever comprising two lever arms which are articulated at one end to each other and at the other end respectively to said fixed structure and to said supporting means, said toggle lever having its arms in aligned extended position when said supporting means supports said silencer element in its operative projected position.

* * * * *

UNITED STATES PATENT OFFICE
CERTIFICATE OF CORRECTION

Patent No. 3,687,222  Dated August 29, 1972

Inventor(s) Andre Alphonse Mederic Leon CAMBOULIVES et al

It is certified that error appears in the above-identified patent and that said Letters Patent are hereby corrected as shown below:

Column 11, Claim 10, between lines 57 and 58, insert

-- a fixed structure; --.

Signed and sealed this 23rd day of January 1973.

(SEAL)
Attest:

EDWARD M. FLETCHER, JR.
Attesting Officer

ROBERT GOTTSCHALK
Commissioner of Patents